United States Patent
Gamo et al.

[11] Patent Number: 5,084,602
[45] Date of Patent: Jan. 28, 1992

[54] APPARATUS FOR SELECTING WIRE ELECTRODE TYPE ELECTRICAL DISCHARGE MACHING OR LASER MACHINING

[75] Inventors: Gotaro Gamo; Norio Karube, both of Tokyo, Japan

[73] Assignee: Fanuc Ltd., Minamitsuru, Japan

[21] Appl. No.: 474,084
[22] PCT Filed: Jul. 31, 1989
[86] PCT No.: PCT/JP89/00786
§ 371 Date: Jun. 26, 1990
§ 102(e) Date: Jun. 26, 1990
[87] PCT Pub. No.: WO90/02020
PCT Pub. Date: Mar. 8, 1990

[30] Foreign Application Priority Data

Aug. 30, 1988 [JP]  Japan .................. 63-213605

[51] Int. Cl.$^5$ .................. B23H 7/02; B23H 9/14; B23K 26/00
[52] U.S. Cl. .................. 219/69.12; 219/121.7
[58] Field of Search .................. 219/69.11, 69.12, 121.7, 219/121.71

[56] References Cited

U.S. PATENT DOCUMENTS

| | | | |
|---|---|---|---|
| 4,092,515 | 5/1978 | Joslin et al. | 219/121.71 |
| 4,711,981 | 12/1987 | Aso et al. | 219/69.12 |
| 4,818,834 | 4/1989 | Rupert | 219/121.71 |
| 4,857,696 | 8/1989 | Taeusch et al. | 219/121.7 |
| 4,889,968 | 12/1989 | Miyama et al. | 219/121.7 |

FOREIGN PATENT DOCUMENTS

| | | | |
|---|---|---|---|
| 57-149118 | 9/1982 | Japan | . |
| 61-86135 | 5/1986 | Japan | 219/69.12 |

*Primary Examiner*—Geoffrey S. Evans
*Attorney, Agent, or Firm*—Staas & Halsey

[57] ABSTRACT

Wire electrode type electrical discharge machining equipment is provided with a wire electrode type electrical discharge machining function and a laser machining function. The laser machining is used to effect rough machining at a high machining rate. The electrical discharge machining is used to effect finishing at a high magnitude of precision. The wire electrode type electrical discharge machining equipment is equipped with a laser generator for laser machining, and a column thereof is equipped with laser beam irradiation means which adjoins an upper wire electrode guide and is opposed to a work piece that is to be irradiated with a laser beam. The wire electrode type electrical discharge machining equipment is further provided with a numerical controller which regulates both the machining operation and the relative position of the wire electrode and the work piece as well as the relative position of a laser beam emitter and the work piece along predetermined loci.

1 Claim, 1 Drawing Sheet

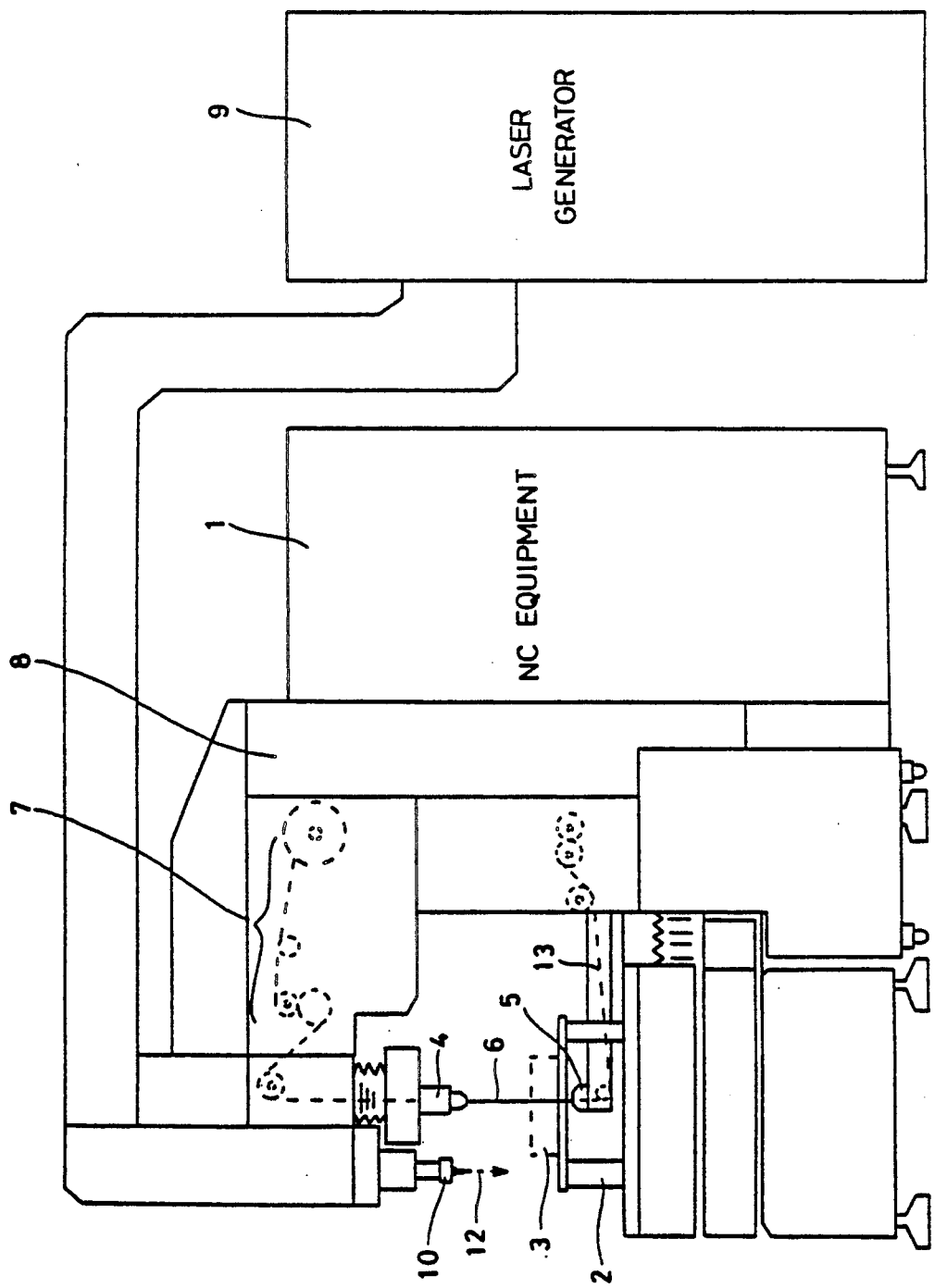

APPARATUS FOR SELECTING WIRE ELECTRODE TYPE ELECTRICAL DISCHARGE MACHING OR LASER MACHINING

BACKGROUND OF THE INVENTION

This invention relates to an improvement applicable to wire electrode type electrical discharge machining equipment. More specifically, this invention relates to an improvement which is applicable to wire electrode type electrical discharge machining equipment and which is developed for the purpose, of decreasing the length of time required for rough machining, without an increase in the floor space and/or in the economical burden.

The major conventional methods for producing a metal mold to be employed for pressing work was a method in which a die sinking machine and a grinder were employed in combination. At present, however, electrical discharge machining, particularly wire electrode type electrical discharge machining, has replaced the foregoing conventional method.

Wire electrode type electrical discharge machining allows a workpiece of a conductor e.g. an extremely hard metal to be machined in a complicated and irregular shape with high accuracy or within the maximum error range of 1 micrometer and with a very high grade of smoothness for the machined surface.

On the other hand, laser machining equipment is available with which an arbitrary workpiece can be machined in a complicated and irregular shape at an extremely high machining rate (approximately 1 m/min). The laser machining has, however, a drawback in which the machining accuracy is unsatisfactory and particularly the smoothness of the machined surface is awkward. This is due to the principle of laser machining which is based on a local melting of the extremely small part of a workpiece, the local melting being caused by exposure of the small part of the workpiece with a laser beam having a small area and a very high energy density.

Wire electrode type electrical discharge machining generally consists of two steps including the first step in which roughing is conducted at a relatively high machining rate and the second step in which finishing is conducted at a relatively low machining rate. In any case, however, wire electrode type electrical discharge machining has a drawback wherein the machining rate is low, resultantly requiring a long time for machining a unit quantity of a workpiece. Even in the case of roughing, the machining rate is approximately 10 mm/min, provided the thickness of the workpiece is approximately 10 mm, despite the corresponding rate of laser machining is approximately 1 m/min.

SUMMARY OF THE INVENTION

The object of this invention is to remove the drawback presented above and to provide wire electrode type electrical discharge machining equipment having a high machining rate, particularly for a roughing step.

To achieve the above object, wire electrode type electrical discharge machining equipment in accordance with this invention is wire electrode type electrical discharge machining equipment which is provided with numerical control equipment, an X-Y table for sustaining a workpiece and which is driven by a servomechanism controlled by the foregoing numerical control equipment (1), a column (8) arranged close to the foregoing X-Y table, an electric power supply for generating electric pulses, a wire electrode which is fed by a wire electrode feeder to extend under tension between an upper wire electrode guide supported by the foregoing column and a lower wire electrode guide supported by an arm supported by the foregoing column, the foregoing wire electrode which penetrates the foregoing workpiece and which is allowed to maintain a predetermined geometrical relation with the foregoing workpiece due to a guiding conducted following commands issued by the foregoing numerical control equipment, wherein the wire electrode type electrical discharge machining equipment is further provided with a laser generator for laser machining, the foregoing column is further provided a laser emitter which collects the laser light emitted by the foregoing laser generator to make a laser beam which is emitted toward the foregoing workpiece (3), the laser emitter being arranged in the neighborhood of the foregoing upper wire electrode and in a position at which the foregoing laser emitter faces the foregoing workpiece, and the foregoing numerical control equipment is provided with first means for issuing commands for maintaining the relative location of the foregoing workpiece and the foregoing wire electrode at a predetermined amount, second means for issuing commands for maintaining the relative location of the foregoing workpiece and the foregoing laser emitter, and third means for selecting either the foregoing first means or the foregoing second means.

BRIEF DESCRIPTION OF THE DRAWING

FIG. 1 is a schematic view of wire electrode type electrical discharge machining equipment in accordance with one embodiment of this invention.

DETAILED DESCRIPTION OF THE PREFERRED EMBODIMENTS

Referring to a drawing, a detailed description will be presented below for wire electrode type electrical discharge machining equipment in accordance with this invention.

Referring to FIG. 1, numerical control equipment 1 memorizes the shape to which a workpiece is machined, variable conditions of machining including the algorithm both for laser machining for roughing and for a wire electrode type electrical discharge machining for finishing, and a function to select either the laser machining mode or the wire electrode type electrical discharge machining mode. A workpiece 3 is placed on an X-Y table 2 which is transfered in a holizontal plane by a servomechanism (not shown) controlled by the numerical control equipment 1, which controls the servomechanism (not shown) to guide the X-Y table 2 with respect to a laser emitter 10 or a wire electrode 6 to allow the workpiece 3 to move along a route predetermined with respect to the laser emitter 10 or the wire electrode 6, for the purpose for allowing the laser emitter 10 or the wire electrode 6 and the workpiece 3 to maintain a predetermined geometrical relation.

A column 8 which is arranged close to the X-Y table 2, supports the laser emitter 10 for laser machining and an upper wire electrode guide 4 for wire electrode type electrical discharge machining.

The laser emitter 10 functions to collect the laser light emitted by the laser generator 9 and to emit a laser beam 12 toward the workpiece 3 for laser machining. An arm 13 supports a lower wire electrode guide 5, and allows the wire electrode 6 which is fed by a wire electrode feeder 7 to penetrate the workpiece 3 and to extend under tension between an upper wire electrode guide 4 and the lower wire electrode guide 5.

The wire electrode 6 is supplied electric pulses by an electric power supply (not shown) for wire electrode type electrical discharge machining.

Presented below will be the procedure for wire electrode type electrical discharge machining employing the foregoing wire electrode type electrical discharge machining equipment.

The first step is an employment of the numerical control equipment 1 and the servomechanism (not shown) for the purpose of moving the X-Y table 2 with respect to the laser emitter 10 to allow the relative location of these members to maintain a predetermined relation. During this move, laser machining is conducted for roughing a workpiece. The machining rate of this roughing is approximately 1 m/min, which is 100 times as fast as that of wire electrode type electrical discharge machining.

The second step is another employment of the numerical control equipment 1 and the servomechanism (not shown), such control being conducted, using the wire electrode 6 rather than the laser emitter 10 as the reference for the purpose of moving the X-Y table 2 with respect to the wire electrode 6 to allow the relative location of these members to maintain a predetermined relation. During this move, wire electrode type electrical discharge machining is conducted for finishing the foregoing workpiece.

The foregoing procedure including two steps realizes a combined advantage including the excellent machining accuracy and smoothness of the machined surface inherent to the wire electrode type electrical discharge machining and high machining rate inherent to the laser machining.

The foregoing description has clarified that this invention is a combination of laser machining and wire electrode type electrical discharge machining, developed for the purpose to allow a wire electrode type electrical discharge machining equipment to enjoy an advantage which can not be allowed without using this combination of the two independent machinings. In other words, after a roughing is conducted at a high rate of 1 m/min employing a laser machining equipment, a finishing is conducted with excellent accuracy in which the error is no larger than 1 micrometer, employing a wire electrode type electrical discharge machining equipment.

The machining procedure of this invention can be assumed to be realized by laser machining equipment and wire electrode type electrical discharge machining equipment, each of which is installed independently from each other. In reality, however, this concept is unrealistic particularly from practical viewpoints. Moreover, realization of the above concept is understood to be entirely impossible from practical viewpoints, based on the following reasons. a. Since laser machining equipment and wire electrode type electrical discharge machining equipment independently require numerical control equipment, a servomechanism, an X-Y table, a column, and the like of its own, the above concept is inevitably accompanied by a double investment, causing an unreasonably heavy economical burden. b. The required floor space is two times as large as either laser machining equipment or wire electrode type electrical discharge machining equipment. c. After roughing conducted by laser machining equipment, a procedure for fitting wire electrode type electrical discharge machining equipment with a workpiece is required with high accuracy, such a fitting procedure requiring a long working time including the time for preparation. Even if this long working time required for fitting wire electrode type electrical discharge machining equipment with a workpiece, is ignored, it is absolutely difficult to fit wire electrode type electrical discharge machining equipment with a roughed workpiece with high accuracy. Therefore, the burden for wire electrode type electrical discharge machining equipment will be identical to that which is required for an unroughed or entirely new workpiece. In other words, if laser machining equipment and wire electrode type electrical discharge machining equipment are independently installed, a single workpiece requires a fitting procedure independently two times. This means a waiver of the most important advantages which are realized by the wire electrode type electrical discharge machining equipment in accordance with this invention.

The foregoing description has clarified that the above concept wherein laser machining equipment and wire electrode type electrical discharge machining equipment are independently installed is entirely insignificant from practical viewpoints.

The foregoing description has clarified that the wire electrode type electrical discharge machining equipment in accordance with this invention, is allowed to enjoy the advantage inherent to the laser machining and the advantage inherent to the wire electrode type electrical discharge machining, because roughing is conducted at a high machining rate of 1 m/min, before finishing is conducted with high accuracy in which the error is no larger than 1 micrometer.

Further, since this invention is a combination of laser machining equipment and wire electrode type electrical discharge machining equipment, wire electrode type electrical discharge machining equipment in accordance with this invention is enjoys various advantages which follow from this combination, including (a) less economical burden and less floor space, because the numerical control equipment, the servomechanism, the X-Y table, the column et al. can be employed both for laser machining equipment and for wire electrode type electrical discharge machining equipment, (b) less magnitude of error to be caused by fitting of a workpiece, because a single fitting is enough both for laser machining equipment and for wire electrode type electrical discharge machining equipment, and less magnitude of working time employed for fitting and for the preparation therefor, because a single fitting is enough both for laser machining equipment and for wire electrode type electrical discharge machining equipment.

The foregoing description has clarified that wire electrode type electrical discharge machining equipment has the advantages that the economical burden and floor space are less, the machining time particularly required for roughing is less, is.

Although the foregoing description is presented referring to a single embodiment, this embodiment is not meant to be construed in a limiting sense. Various other embodiments and/or modifications of this invention will become apparent to persons skilled in the art upon reference to the description of this invention. It is therefore contemplated that the claim will cover any such embodiments and/or modifications as fall within the true scope of this invention.

We claim:

1. Wire electrode type electrical discharge machining equipment comprising:

numerical control equipment, an X-Y table for sustaining a workpiece and which is driven by a servomechanism controlled by said numerical control equipment, a column arranged close to said X-Y table, an electric power supply for generating electric pulses, a wire electrode which is fed by a wire electrode feeder to extend under tension between an upper wire electrode guide supported by said column and a lower wire electrode guide supported by an arm supported by said column, said wire electrode penetrates said workpiece and maintains a predetermined geometrical relation with said workpiece due to being guided under commands issued by said numerical control equipment a laser generator for laser machining, a laser emitter which collects laser light emitted by said laser generator to make a laser beam which is emitted toward said workpiece, said laser emitter being arranged in the neighborhood of said upper wire electrode and in a position at which said laser emitter faces said workpiece, first means for issuing commands for maintaining the relative location of said workpiece and said wire electrode at a predetermined amount, second means for issuing commands for maintaining the relative location of said workpiece and said laser emitter, and third means for selecting one of said first means and said second means.

* * * * *